April 21, 1970
H. H. BURKINS
3,507,424
BODY SUPPORT FOR A CAMERA
Filed June 28, 1968
2 Sheets-Sheet 1
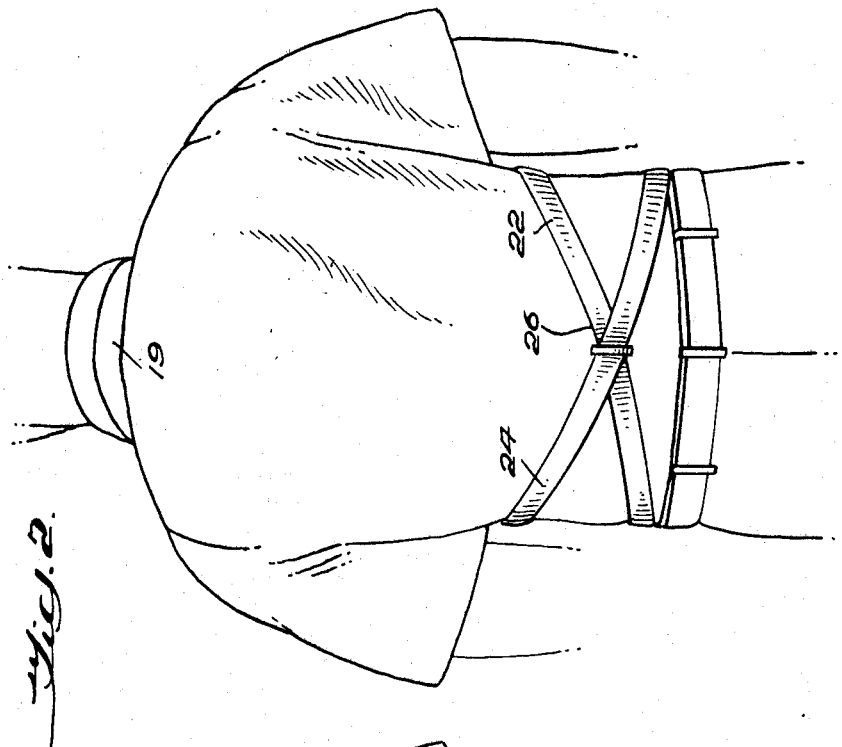
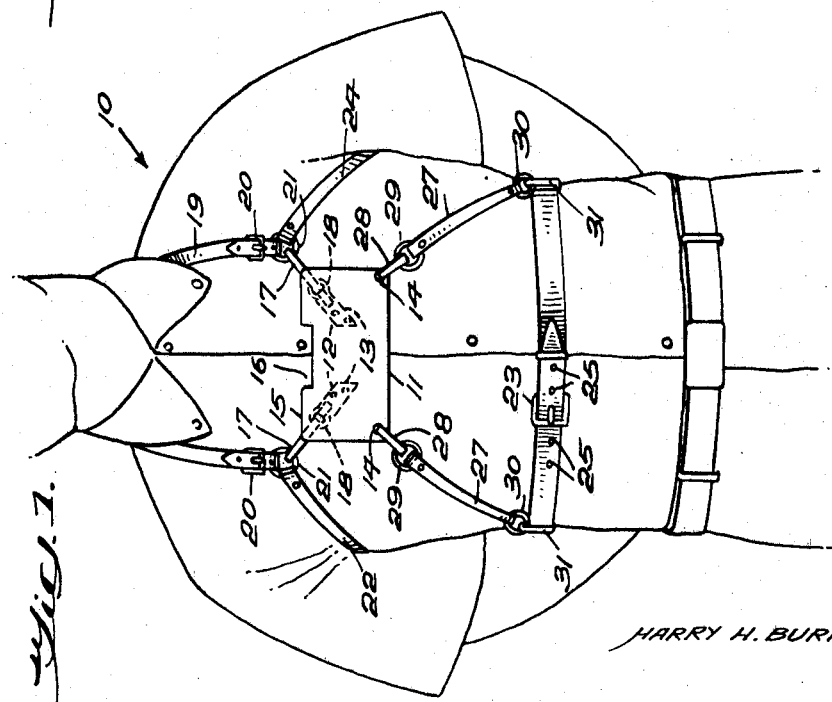
INVENTOR
HARRY H. BURKINS,
BY Kimmel, Crowell & Weaver
ATTORNEYS

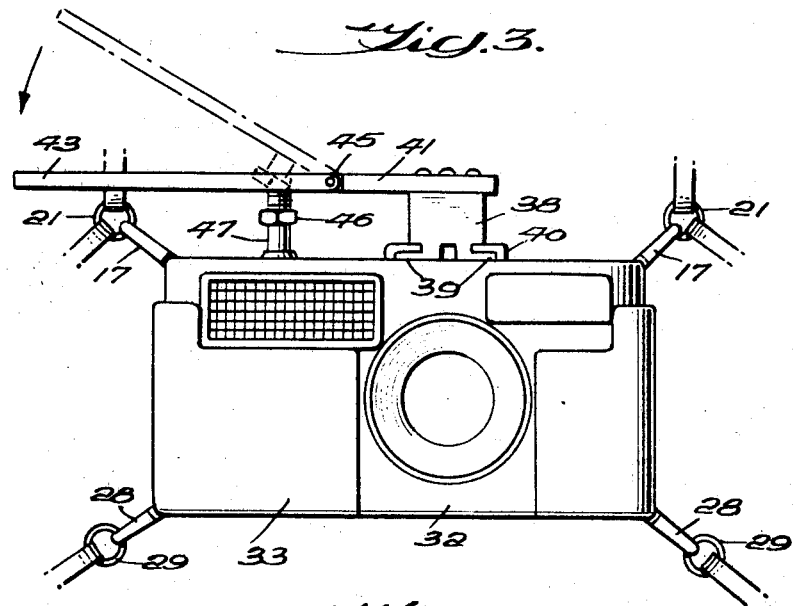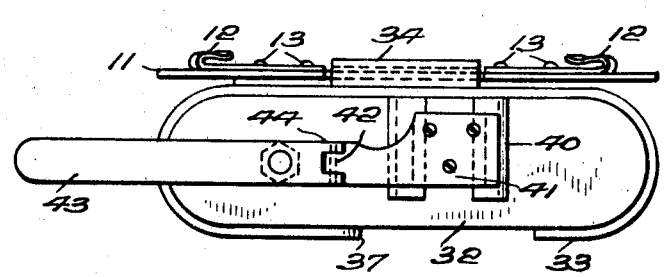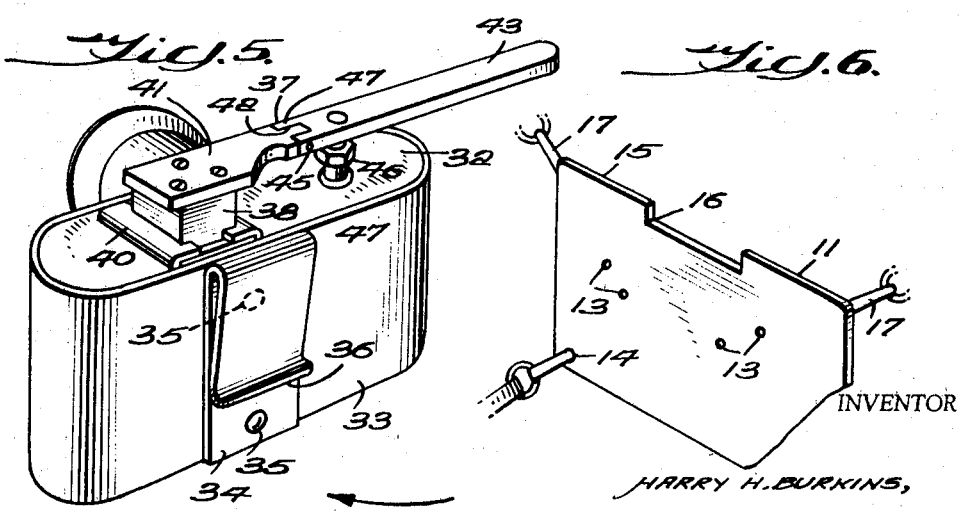

United States Patent Office
3,507,424
Patented Apr. 21, 1970

3,507,424
BODY SUPPORT FOR A CAMERA
Harry H. Burkins, 5 S. Highland Ave.,
York, Pa. 17404
Filed June 28, 1968, Ser. No. 741,128
Int. Cl. A45f 3/00
U.S. Cl. 224—5                                      5 Claims

ABSTRACT OF THE DISCLOSURE

A body anchored camera support which permits the taking of pictures without the use of a tripod is disclosed. Also disclosed is a lever system for actuating the shutter release of the camera when the camera is attached to the body support.

In the use of so-called "candid cameras" it is normal to either support the camera on a tripod or to use it at eye level by holding it in the hands of the user. The use of a tripod clearly is awkward and prevents the camera from being used for taking snapshots and quick photographs. When the camera is held at eye level in the hands, it is quite obvious that pictures are being taken, and in addition, the camera is often jiggled during the taking of the picture to thus produce defective images on the film.

The present invention provides a mounting for a camera which is securely fastened to the body of the user in a position on the chest of the user. The camera is aimed by aiming the body, and pictures can be taken without it appearing obvious to persons observing the photographer. The support being firmly anchored to the body of the photographer virtually eliminates all movement of the camera during picture taking, and hence, poor pictures due to jiggling are no problem.

SUMMARY OF THE INVENTION

The primary object of the invention is to provide a body anchored camera support which will produce a steady mount for a camera.

Another object of the invention is to provide a device of the class described above in which the camera is supported on the chest of the photographer.

Other objects and advantages will become apparent in the following specification when considered in the light of the attached drawings.

DESCRIPTION OF THE DRAWING

FIGURE 1 is a front elevation of the invention shown attached to the body of the photographer;

FIGURE 2 is a rear view of the invention illustrated in FIGURE 1;

FIGURE 3 is a front elevation of the camera attached to the support, parts broken away for convenience of illustration;

FIGURE 4 is a top plan view of the invention with the camera shown attached to the support plate;

FIGURE 5 is a rear perspective view of the camera shown removed from the support plate; and FIGURE 6 is a perspective view of the support plate with parts broken away for convenience of illustration.

DESCRIPTION OF THE PREFERRED EMBODIMENT

Referring now to the drawings in detail, wherein like reference characters indicate like parts throughout the several figures, the reference numeral 10 indicates generally a body support for cameras constructed in accordance with the inventioin.

The camera support 10 comprises a generally rectangular rigid support plate 11 having a pair of oppositely disposed clips 12 secured thereto by rivets 13 so that the clips 12 are adjacent the upper corners of the support plate 11. The support plate 11 is provided with a pair of openings 14 adjacent the lower corners thereof for reasons to be assigned. The support plate 11 is formed of rigid material, preferably metal, and is relatively thin as can be seen in FIGURE 6. The upper edge 15 of the support plate 11 has a generally rectangular notch 16 formed in its central portion as can be seen in FIGURES 1 and 6.

A spring snap 17 is secured to each of the clips 12 by means of a closed ring 18. A neck strap 19 extends around the back of the neck of the user terminating in adjustable buckles 20 on each end thereof. A metal ring 21 is secured to the neck strap 19 by the adjustable buckles 20. The snaps 17 detachably snap to the rings 21 as can be seen in FIGURE 1.

A strap 22 has one end secured to one of the rings 21 with the opposite end terminating in a belt buckle 23. A second strap 24 is secured to the other of the rings 21 and terminates in a section having a plurality of holes 25 to cooperate with the belt buckle 23 to permit adjustable connection of the strap 22 to the strap 24. The strap 22 and the strap 24 cross at the back of the photographer with the straps extending through a loop 26 at their point of crossing. A pair of holddown straps 27 each has a snap hook 28 secured to the upper end thereof by means of a ring 29 through which the straps 27 extend. The lower ends of the straps 27 are secured to rings 30 which are in turn secured to loops 31 through which the straps 22 and 24 respectively extend.

The adjustable buckles 20, 23 permit the body support 10 to be adjusted to firmly fix the support plate 11 to the chest of the photographer.

Referring now to FIGURES 3 through 6, a camera 32 of conventional construction is provided with a conventional carrying case 33. A relatively wide spring clip 34 is secured to the camera case 33 by a pair of rivets 35 as can be seen in FIGURE 5. The spring clip 34 has a tongue portion 36 which is adapted to engage over the support plate 11 with the upper side edges of the spring clip 34 engaging the opposite ends of notch 16 securing the camera 32 rigidly to the support plate 11.

A shutter release lever generally indicated at 37 includes a mounting block 38 having bayonet tongues 39 formed on the lower end thereof for engagement in the bayonet slot flash gun support 40 conventionally formed on the upper surface of the camera 32. An arm 41 is rigidly secured to the block 38 and extends laterally outwardly therefrom terminating in a tongue 42. A handle 43 has a bifurcated end portion 44 which engages on opposite sides of the tongue 42 and is pivotally secured thereto by a pivot pin 45.

A contact member 46 is threaded to the handle 43 in depending relation thereto and may be vertically adjusted with respect to the handle 43 by threading it into and out of the handle 43. The shutter release 47 of the camera 42 projects upwardly from the upper surface of the camera 32 in a conventional manner and the contact member 46 is arranged to engage the shutter release 47 so that upon downward movement of the handle 43 the shutter of the camera 32 will be conventionally released to take a picture.

When it is desired to take pictures as secretly as possible, the camera support 10 with camera attached is mounted on the body of the photographer and then a jacket or coat is worn so as to cover the straps with only the lens of the camera projecting from the front of the coat. In using this arrangement where secrecy is desired, a cable release of conventional design is connected to the shutter in the conventional manner and extends to one pocket of the photographer's garments and can be released by pressure of the hand on the cable release.

Having thus described the preferred embodiment of the invention, it should be understood that numerous struc-

I claim:
1. A body support for cameras comprising
   a rigid generally rectangular support plate,
   a neck strap,
   means detachably and adjustably securing said neck strap to the upper corners of said support plate,
   a body encompassing strap secured to each of said means connecting said neck strap to said support plate, said body encompassing straps being at all times below the wearer's shoulders,
   means connecting the lower corners of said support plate to said body encompassing straps,
   a camera case, and
   means detachably connecting said camera case to said support plate.
2. The device as claimed in claim 1 wherein said support plate is provided with a notch in the upper edge thereof and the means connecting said camera case to said support plate engages in said notch.
3. The device as claimed in claim 2 wherein the means connecting said camera case to said support plate includes a spring clip secured to said camera case and slidably engaged over said support plate within said notch.
4. The invention as set forth in claim 1 including a camera mounted in said camera case, a transversely extending lever, detachably secured to said camera, an adjustable contact member mounted on said lever and arranged for engagement with the shutter release of said camera.
5. The invention as set forth in claim 1 wherein the means extending between the lower corners of said support plate and said body encompassing straps comprises holddown straps, means detachably connecting the upper ends of said holddown straps to the lower corners of said support plate, and loops slidably mounted on said body encompassing straps with said loops connected to the lower ends of said straps.

References Cited

UNITED STATES PATENTS

| | | | |
|---|---|---|---|
| 332,123 | 12/1885 | Walton | 224—25 |
| 2,990,089 | 6/1961 | Nystrom | 224—5 |

GERALD M. FORLENZA, Primary Examiner

F. E. WERNER, Assistant Examiner

U.S. Cl. X.R.

224—25